United States Patent [19]

Sauer

[11] 4,224,275
[45] Sep. 23, 1980

[54] PROCESS FOR MAKING CONTAINERS

[75] Inventor: Donald G. Sauer, Harwinton, Conn.

[73] Assignee: National Can Corporation, Chicago, Ill.

[21] Appl. No.: 8,607

[22] Filed: Feb. 1, 1979

Related U.S. Application Data

[63] Continuation-in-part of Ser. No. 820,444, Aug. 1, 1977, abandoned, which is a continuation of Ser. No. 615,813, Sep. 22, 1975, abandoned.

[51] Int. Cl.² .................. B29D 9/00; B29C 17/04
[52] U.S. Cl. .................. 264/516; 264/550; 264/259; 264/294; 425/112; 425/387.1; 425/523
[58] Field of Search ............ 425/112, 388, 523, 387.1; 264/132, 134, 294, 296, 322, 259, 512, 516, 544, 553, 549-551

[56] References Cited

U.S. PATENT DOCUMENTS

| | | |
|---|---|---|
| 2,889,651 | 6/1959 | Baldanza . |
| 3,170,970 | 2/1965 | Adams . |
| 3,409,939 | 11/1968 | Hey . |
| 3,412,188 | 11/1968 | Seefluth . |
| 3,468,994 | 9/1969 | Gilbert . |
| 3,471,601 | 10/1969 | Goetgheluck .................. 264/512 |
| 3,471,896 | 10/1969 | Ninneman . |
| 3,489,601 | 1/1970 | Stapp et al. . |
| 3,496,597 | 2/1970 | Ayres . |
| 3,586,748 | 6/1971 | Ayers . |
| 3,602,946 | 9/1971 | Curetti et al. . |
| 3,642,975 | 2/1972 | Duggins et al. .................. 264/314 |
| 3,732,348 | 5/1973 | Ignell .................. 264/134 |
| 3,737,496 | 6/1973 | Voorhees, Sr. . |
| 3,739,052 | 6/1973 | Ayres et al. . |
| 3,923,190 | 12/1975 | Roth .................. 264/150 X |
| 3,966,860 | 6/1976 | Hudson et al. .................. 264/292 X |
| 3,995,763 | 12/1976 | Ayres et al. .................. 425/388 X |
| 4,120,932 | 10/1978 | Roth .................. 264/292 |
| 4,122,147 | 10/1978 | Vrcelj .................. 264/255 |

FOREIGN PATENT DOCUMENTS 1200794 8/1970 United Kingdom .
1325726 8/1973 United Kingdom .

Primary Examiner—Jan H. Silbaugh
Attorney, Agent, or Firm—Hill, Van Santen, Steadman, Chiara & Simpson

[57] ABSTRACT

A process for thermoforming laminated hollow articles including a plurality of processing steps wherein a thermoplastic material heated to a plastic state is selectively deposited area-wise on a sheet of thermoplastic material and such resulting laminate of thermoplastic materials is positioned proximate to a female mold of a thermoforming apparatus including preferably a plug assist for a subsequent forming of laminated hollow articles.

10 Claims, 17 Drawing Figures

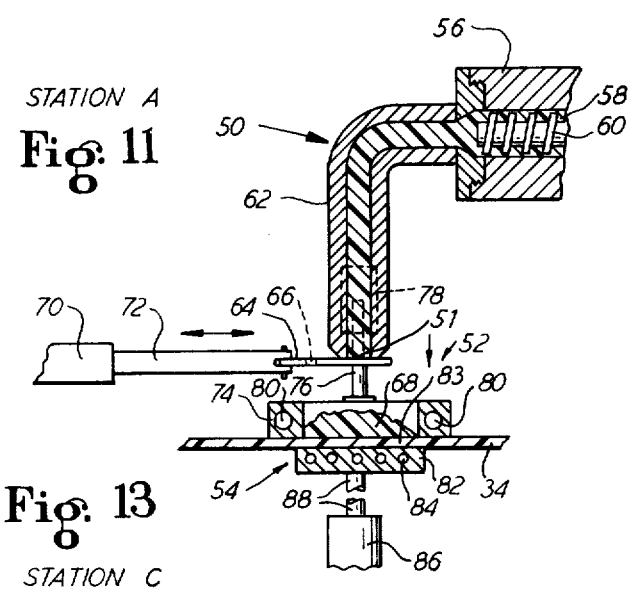
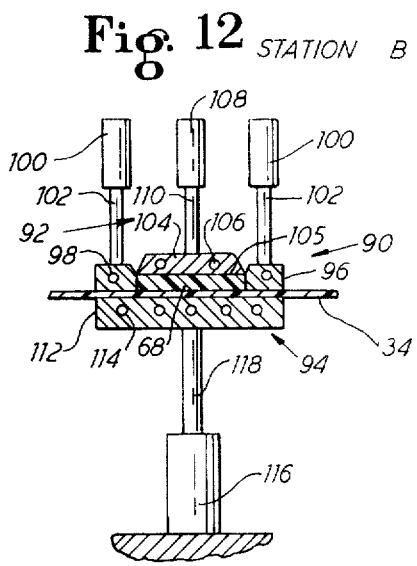
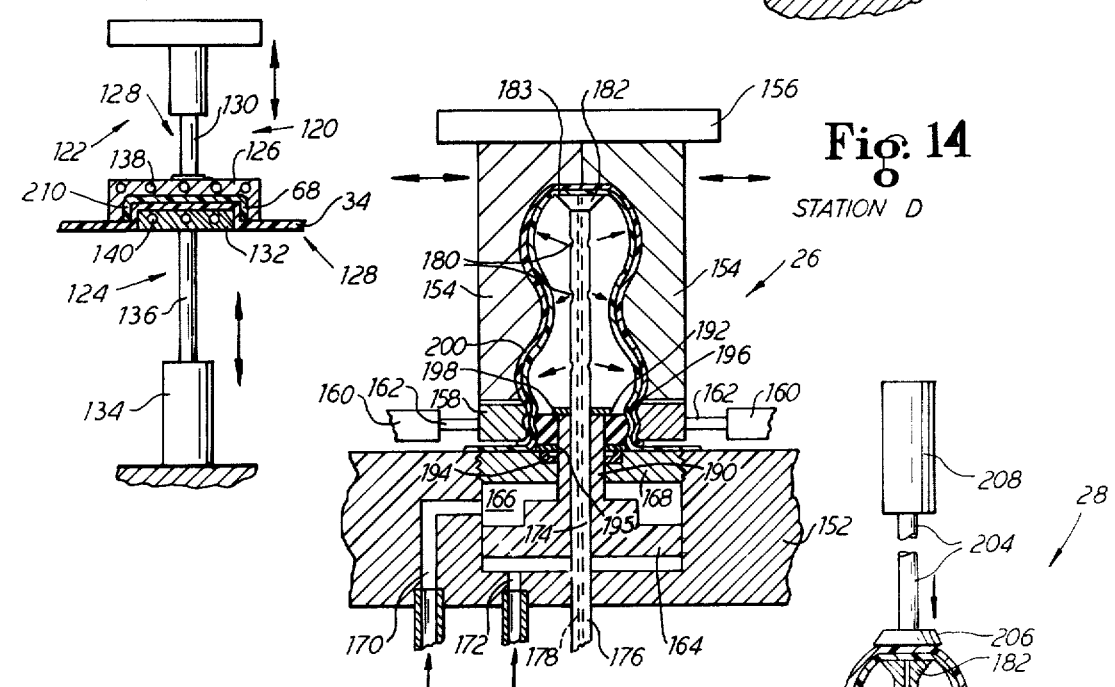
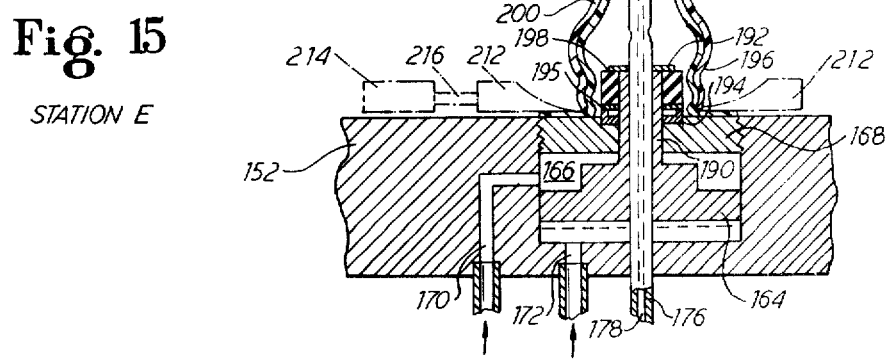

PROCESS FOR MAKING CONTAINERS

RELATED APPLICATION

This application is a continuation-in-part of my earlier filed U.S. Ser. No. 820,444 filed Aug. 1, 1977, now abandoned, which in turn is a Rule 60 Continuation of U.S. Ser. No. 615,813, filed Sept. 22, 1975, now abandoned.

BACKGROUND OF THE INVENTION

This invention lies in the field of processes for thermoforming hollow multilayered plastic articles from a sheet of thermoplastic material.

Many processes have been advanced for manufacturing a hollow plastic article formed of a plurality of layers wherein the article is provided with an inner wall of a plastic material having certain desired properties and an outer wall of a plastic material exhibiting other desired properties. For examples, Berger U.S. Pat. No. 3,122,598 discloses a process for forming decorative plastic articles using injection molding techniques, Sherman U.S. Pat. No 2,710,987 discloses a method and apparatus for forming laminated plastic articles using extrusion blow molding techniques, and Valyi U.S. Pat. No. 3,719,735 discloses a process for blow molding a laminated container from a composite parison which is formed by injecting a thermoplastic material over a preformed liner.

While thermoforming techniques have been used to form hollow articles utilizing preformed laminated sheets comprised of one or more layers of plastic materials, none of such techniques have employed a combination of a preformed thermoplastic sheet and an extruded mass or quantity of a different thermoplastic material deposited thereagainst.

Multilayered plastic containers offer various advantages, substantial resistance to oxygen permeation, resistance to carbon-dioxide diffusion, capacity for storing products under moderate pressure over extended period of time, and the like.

In one prior art plastic sheet thermoforming technique, a fluid pressure applied within a pressure box, such as a pressure produced by compressed air or the like, presses a softened plastic sheet material against the contours of a male mold while a relatively low pressure is exerted from the male mold. In another prior art plastic sheet thermoforming technique, a vacuum from within a female mold is exerted upon one face of a softened plastic sheet material while atmospheric pressure (or a pressurized fluid) is exerted upon the opposing face thereof to shape such softened thermoplastic sheet material against the surface of a female mold. It is possible to use a combination of these two techniques.

BRIEF SUMMARY OF THE INVENTION

More particularly, this invention is concerned with an improved thermoforming technique wherein a web or sheet of one thermoplastic material has a mass or quantity of another thermoplastic material deposited thereagainst. The heat softened composite is then formed or shaped while in a stretchable plastic state by being drawn or pressed against the contours of mold die members under the influence of pressure differentials. The composite is first formed against the contours of a male mold and then is formed against the surface of a female mold. Multi-walled containers can thus be produced.

This technique can be practiced using a plurality of processing stations wherein a thermoplastic material heated to a plastic state is selectively deposited areawise on a sheet of thermoplastic material, and the resulting laminate composite of thermoplastic material, after being positioned proximate to selected female and male mold members, is subjected to appropriate pressure differentials in accordance with thermoforming principles to form a desired laminated hollow article.

An object of the present invention is to provide a new and improved process for thermoforming a laminated hollow plastic article.

Another object is to provide a technique for making multiwalled plastic articles from a preformed thermoplastic sheet and a measured mass or quantity of thermoplastic material contacted against one face thereof selectively.

Another object is to provide a plastics forming technique of the type above indicated which can be practiced economically and which can minimize and even eliminate prior art plastic material recovery and recycling problems.

Various other objects, aims, features, purposes, advantages and the like will become apparent from the herein provided description of this invention taken together with the accompanying drawings.

BRIEF DESCRIPTION OF THE DRAWINGS

In the drawings:

FIG. 11 is a partial side elevational view of a first station of the apparatus of FIGS. 9 and 10, said station being adapted for the selective deposition of a heated thermoplastic material on a heated thermoplastic sheet;

FIG. 12 is a partial side elevational view of a second station of the apparatus of FIGS. 9 and 10, said station being adapted for distributing such deposition on such thermoplastic sheet;

FIG. 13 is a partial side elevational view of a third station of the apparatus of FIGS. 9 and 10, said station being adapted for preforming the laminate composite thermoplastic materials produced in such second station;

FIG. 14 is a partial side elevational view of a fourth station of the apparatus of FIGS. 9 and 10, said station being adapted for forming the hollow article from such preformed composite produced in such third station; and FIG. 15 is a partial side elevational view of a fifth station of the apparatus of FIGS. 9 and 10, said station being adapted for cooling the formed article produced in such fourth station prior to ejection of such article from the apparatus;

DETAILED DESCRIPTION

It will be appreciated that the type of thermoplastic or thermoelastically deformable material employed in the present process is generally determined by the economics and duty to which the hollow article will eventually be placed. Among the many thermoplastic resins adaptable to thermoforming in accordance with the present invention are high-impact polystyrene, polybutadiene, styrene-butadiene blends or copolymers, styrene/acrylonitrile copolymers, styrene/butadiene/acrylonitrile graft copolymers, acrylonitrile copolymers with acrylic monomers (including "Barex", a trademark of Sohio Corporation), polyvinylchloride and related vinyl polymers, polyallomers, nylons, polyesters, such as polyethylene terephthalate, formaldehyde polymers, polyolefins such as polyethylene and polypropylene, nitrocellulose, cellulose acetate, cellulose propionate, cellulose acetate, acetate butyrate, polymethyl methacrylate, ethyl cellulose, benzyl cellulose, ester-esters of cellulose, and the like.

Figure 1:
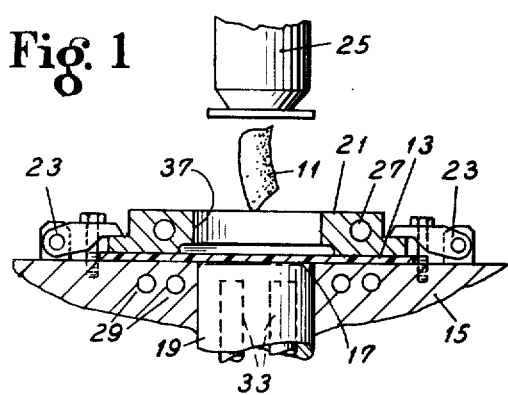
FIG. 1 is a vertical sectional view through one embodiment of simplified apparatus adapted for the practice of the process of this invention, said apparatus being arranged in a first stage or mode, some parts thereof broken away, and some parts thereof shown in section.

Production of a multilayered container of this invention is exemplified in the embodiment shown in FIGS. 1-8. Referring to FIG. 1, a quantity of thermoplastic heated to a plastic condition is deposited from extruder 25 on a preformed sheet 13 of a (preferably different) thermoplastic. Sheet 13 is supported in a flattened configuration on flat surfaced working table 15 centrally over the head 17 of a reciprocatable cylindrical piston 19. Head 17 is here maintained in a level configuration with the surface of table 15. A forming ring or chase 21 is mounted by clamp assemblies 23 over and against sheet 13. Clamp assemblies 23 thus also hold sheet 13 in a fixed relationship to other elements, such as chase 21. Chase 21 has a circular central bore 27 defined therein and bore 27 is oriented generally coaxially with piston 19 and head 17 thereof. Chase 21 and table 15 are each internally heated by electric resistance heaters 27 and 29, respectively. Piston 19 is likewise heated by electric resistance heater 33. Herein, any conventional heating means may be used such as a circulating heat exchange fluid, a combination of electrical and fluidic heating, or the like, as desired. Heaters 27, 29 and 33 permit one to heat and maintain sheet 13 at some predetermined temperature. Instead of directly depositing quantity 11 on sheet 13 from extruder 25, one can, if desired, deposit quantity 11 on a suitably sized, preferably heated, transport tray or the like located adjacent to an extruder. Then quantity 11 is transportable on such tray for deposition on or against the sheet member 13.

Figure 2:
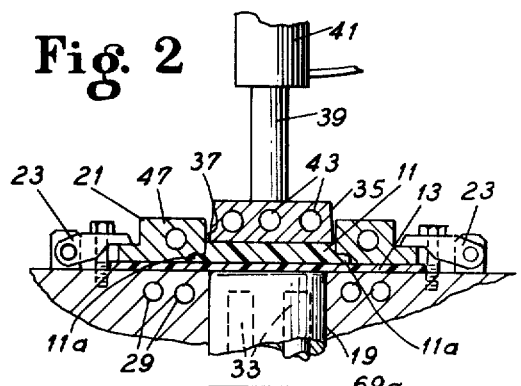
FIG. 2 is a view similar to FIG. 1, but illustrating such apparatus arranged in a second processing stage.
Figure 3:
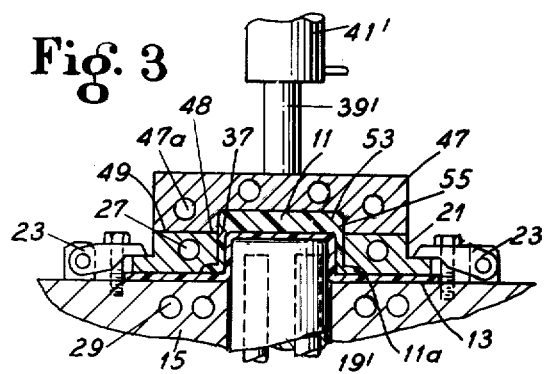
FIG. 3 is a view similar to FIG. 1, but illustrating such apparatus arranged in a third processing stage.

Once quantity 11 is deposited on sheet 13, a shoe 35 is positioned at chase 21 (see FIG. 2). Shoe 35 has a diameter only slightly smaller than the bore 37 of chase 21 so as to provide a minimum clearance therebetween and thereby result in little and preferably no loss of material from quantity 11 between shoe 35 and chase 21. Shoe 35 is internally heated by electric resistance heater 43 or the like as desired. The back face of shoe 35 is joined to the forward (lower) end of rod 39 which in turn is a part of fluid cylinder assembly 41. The arrangement between shoe 35, rod 39 and cylinder assembly 41 is such that, when rod 39 is extended by fluid pressure applied in cylinder assembly 41, shoe 35 is compressed against quantity 11 so as to shape and conform quantity 11 into a disc-like configuration adjacent to one face of sheet 13 within chase 21 below shoe 35. A clamping flange 11a, extending radially outward of the disc-like configuration is formed therewith.

Next, the shoe 35 is removed from quantity 11 and bore 37 by retracting rod 39 by cylinder assembly 41. Then, at a subsequent station, a cylinder assembly 41 moves a female die plate 47 (see FIG. 3) which is provided with a rim 48 for face to face engagement with the periphery 49 of chase 21 and which is further provided with a central recess 53 whose diameter is equal to that of bore 37. Plate 47 is internally heated by electric resistance heaters 47a. Thus, bore 37 and recess 53 combine to define a female mold cavity. Plate 47 is maintained against chase 21 by rod 39' which is axially pressurized by fluid pressure applied in cylinder assembly 41'. With plate 47 thus positioned and held, piston 19' is raised against the composite of sheet 13 and shaped quantity 11 by a rod and fluid cylinder assembly (not detailed, but similar to rod 39' and cylinder 41'). The resulting preform 55 comprised of the composite of sheet 13 and quantity 11 has the cross-sectional configuration shown in FIG. 3.

Now, piston 19' is lowered, plate 47 is raised, clamp assemblies 23 are released, and chase 21 is removed from sheet 13 and associated preform 55. The sheet 13 and the associated preform 55 are then moved to a different flat surfaced working table 57 (see FIG. 4), and such are centrally positioned over the somewhat raised (relative to the surface of table 57) head 59 of a reciprocatable cylindrical pistion 61 whose diameter is somewhat less than the diameter of piston 19'. Then, a pair of mating forming plates 63 are brought into operative association circumferentially about the sides of preform 55 with the piston 61 centrally disposed therewithin in preparation of the following stretching operation as best seen in FIG. 5.

Figure 4:
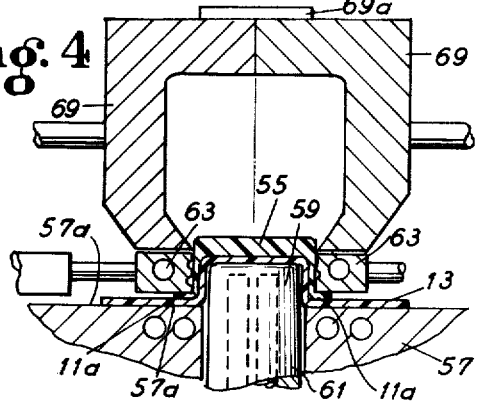
FIG. 4 is a diagrammatic vertical sectional view through another embodiment of simplified apparatus adapted for the practice of the process of this invention, said apparatus being arranged in a fourth stage or mode, some parts thereof broken away, and some parts thereof shown in section.

A pair of mating blow mold halves 69 are brought into operative association over and about and in adjacent axial aligned relationship to, the forming plates 63, and halves 69 are mechanically locked together in place conventionally (not detailed, but see FIG. 4).

A plate 69a abuting against engaged mold halves 69 is moved axially downwardly thereagainst by a fluid cylinder assembly (not detailed, but conventional) so that the preform 55 is clamped between working table surface 57a and plates 63 against the clamping flange 11a. If desired, plates 63 can have thread molds defined therein spirally about their neck region so as to provide the capability to later mold threads by swaging into the stretched preform 79 during the stretched preform 79 formation as described below, being formed by a swaging operation (see FIG. 5). Table 57, piston 61, and plates 63 are, respectively, each internally heated by electric resistance heaters 71, 72, and 73, or by other heating means as desired.

Figure 5:
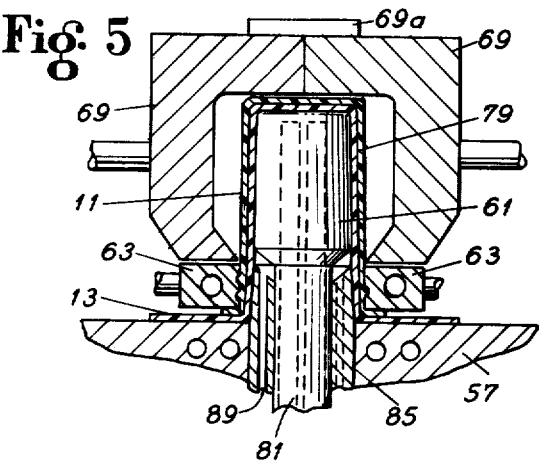
FIG. 5 is a view similar to FIG. 4, but illustrating such apparatus arranged in a fifth processing stage.

Next, referring to FIG. 5, with the plates 63 thus in place, cooperatively with the mold halves 69, piston 61 is raised against the preform 55 (as shown in FIG. 4) by a rod 81 and a fluid cylinder assembly (not detaled, but similar to cylinder 41). The resulting stretched preform 79 comprised of stretched sheet 13 and associated stretched quantity 11 has the cross sectional configuration shown in FIG. 5. Circumferentially about rod 81, and in longitudinally adjacent but spaced relationship to the bottom of piston 61, is a sleeve 85 which reciprocates with rod 81. Sleeve 85 has a longitudinally extending channel 89 defined therein, and the outside diameter of sleeve 85 is such that sleeve 85 maintains a relationship with plates 63 such that the developing stretched preform 79 remains clamped therebetween sealingly. As the stretched preform 79 develops, pressurized fluid (e.g. air or the like) in mold halves 69 between stretched preform 79 and mold halves 69 is vented to the atmosphere by vent holes (not detailed).

Figure 6:
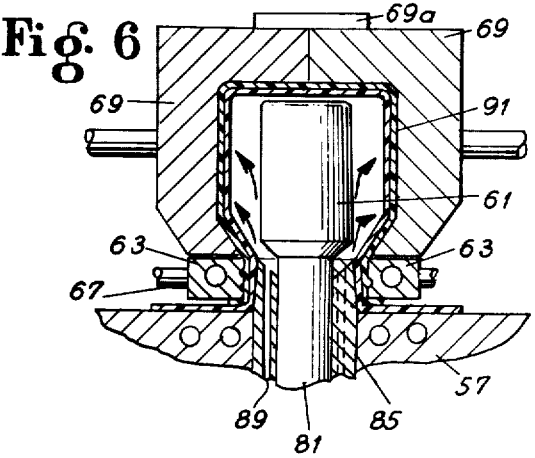
FIG. 6 is a view similar to FIG. 4, but illustrating such apparatus arranged in a sixth processing stage.

When the stretched preform 79 reaches for example approximately the relative size development shown in FIG. 5, compressed gas, such as air or the like illustrated by the arrows shown is admitted to channel 89 which results in internal expansion or inflation of the stretched preform 79 using a pressure sufficient to cause the outer wall portions thereof to move outwards and engage the adjacent interior mold wall surfaces of mold halves 69 and thereby assume the configuration illustrated in FIG. 6 and identified by the numeral 91; such configuration is actually that of the walls of a finished container 91 produced by such practice of this invention.

Figure 7:
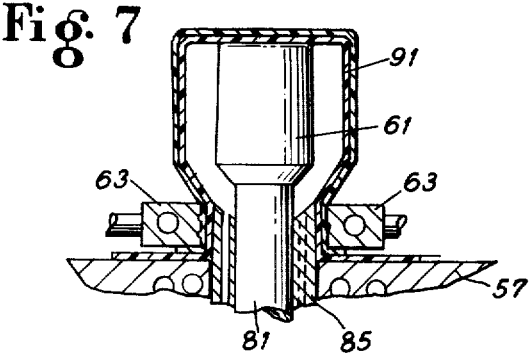
FIG. 7 is a diagrammatic vertical sectional view through another arrangement of the apparatus of FIG. 4 adapted for the practice of a seventh processing stage.

At this general time, in the operational sequence, the interior pressure of container 91 is reduced via channel 89 to a minimum level sufficient to maintain the container 91 shape, and mold halves 69 are disengaged and removed from container 91. Concurrently, piston 61 is raised in the interior of container 91 until the head 59 thereof rests against and supports the inside bottom surface of container 91, all as illustrated in FIG. 7. The sleeve 85 is maintained in a stationary supporting engagement with the neck region of container 91 in cooperation with the plates 63 by sliding the rod 81 axially and longitudinally relative to the preferably tapered sleeve 85 as piston 61 is so raised thereby swage forming threads. Container 91 is then allowed to cool in ambient air until container 91 has cooled at least sufficiently to be self-supporting.

Figure 8:
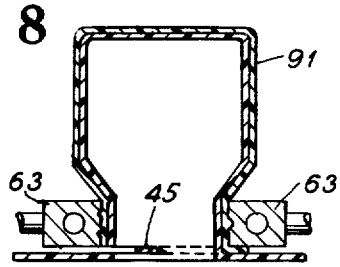
FIG. 8 is a simplified view illustrating a final trimming stage.

Finally, piston 61 and sleeve 85 are retracted from the interior of container 91, so that the head 59 of piston 61 is flush approximately with the surface of table 57 (not detailed). Then, with the plates 63 still grasping the neck of container 91, a trim die 45 or the like is drawn transversely across the mouth of container 91 as illustrated in FIG. 8. Trimming is an optional step not required to practice thermoforming, stretching and blow molding by the practice of this invention. Trimming can be accomplished by other means. Sometimes, as in a container having a flanged top without a thread finish, trimming may not be performed.

Figure 10:
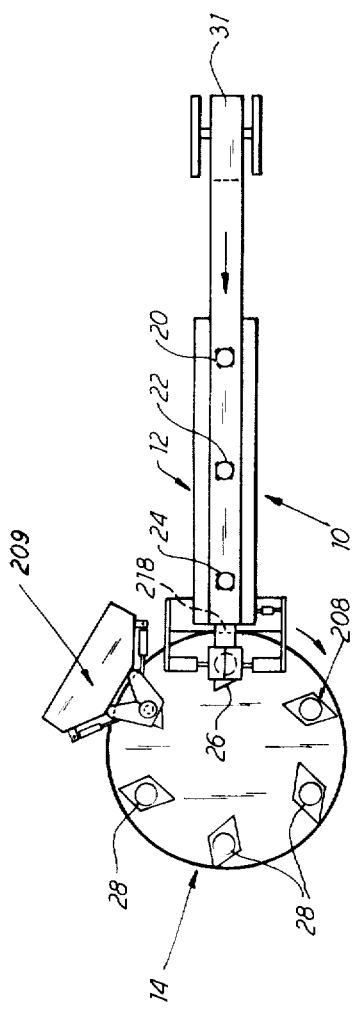
FIG. 10 is a schematic top elevational view of the apparatus of FIG. 9.
Figure 9:
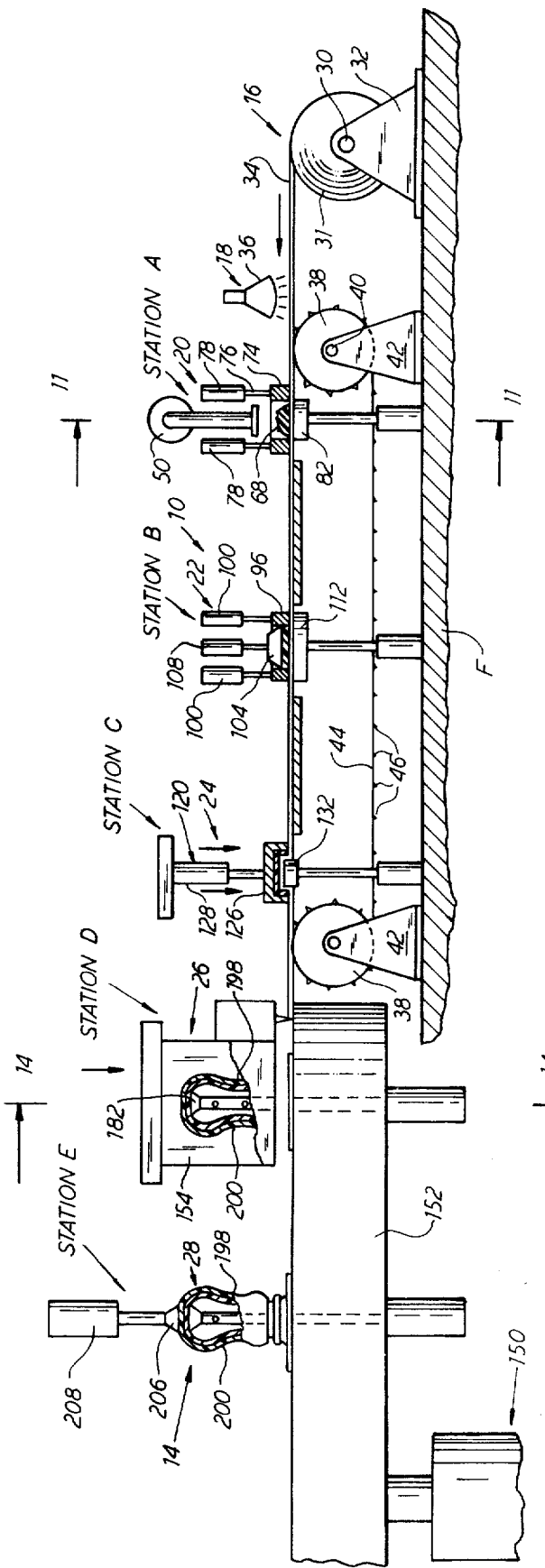
FIG. 9 is a vertical view, partially in section of another embodiment of apparatus suitable for practicing the process of the present invention with some accessories omitted therefrom for greater clarity.

Referring now to FIGS. 9 and 10, there is seen a thermoforming apparatus generally indicated as 10, illustrating the practice of the process of the present invention. Apparatus 10 includes a preforming section 12 and a forming section 14. It will be understood by one skilled in the art that the apparatus 10 is provided with the conventional motor and timing subassemblies, including conventional instrumentation, timing circuits, safety features, and the like, for automatic and continuous operation of the apparatus 10; however, such parts and subassemblies are not shown and detailed in the interest of clarity. The preforming section 12 includes supply roller assembly 16; heating station 18; operation station A (also designated 20); operating station B (also designated 22); and operating station C (also designated 24). The forming section 14 includes molding station D (also designated 20) and cooling station E (also designated 28).

The supply roller assembly 16 includes a shaft 30 journalled for rotation on supports 32 positioned on a foundation F. On the shaft 30, is mounted a core (not detailed) on which is convolutely wound a roll 31 of a sheet or strip of thermoplastic material 34 selected for the specific properties to be imparted to the inside wall of a product. The heating station 18 is here provided with a source of actinic electromagnetic radiation, such as an infra-red lamp or lamps 36, as a means for uniformly heating and thereby softening the sheet of thermoplastic material 34 in the region thereat prior to sheet indexing sequentially in a stop and go manner into subsequent stations A, B and C, respectively, of the preforming section 12. For some modes of operation, the heating station 18 is preferred; however, it is contemplated that for other operating modes and conditions, the heat of the molten thermoplastic material 68 being deposited on the sheet of thermoplastic material 34 at station A could be sufficient to heat area-wise the underlying sheet of thermoplastic material 34 to a temperature at which said sheet may be thermoformed in accordance with the present invention thereby eliminating the necessity of using such heating station 18. A sheet support assembly including drums 38 (paired) mounted on shafts 40 (paired) journalled for rotation in support trunnions 42 is positioned on foundation F. An endless chain belt 44 is mounted about the drums 38 to support the sheet of thermoplastic material 34 during passage thereof through the stations A, B and C. Belt 44 is provided with longitudinally equally spaced, upstanding pin-type retaining elements 46 associated with links (not detailed) forming the chain belt 44 to ensure positive indexing movements of the sheet 34 through the preforming section 12 of thermoforming apparatus 10. Clamping means (not detailed) may be used over drums 38 to prevent slippage of sheet 34 over belt 44.

Referring now to FIG. 11, in conjunction with FIG. 9, station A is seen to be provided with an extrusion assembly 50, a placement assembly 52, and a support assembly 54. The extrusion assembly 50 includes a barrel 56 having a cylindrically-shaped chamber 58 in which an extruder screw 60 is centrally disposed for moving a plastic material therethrough, as known to one skilled in the art. The extrusion assembly 50 includes an L-shaped extrusion nozzle 62 which is suitably threaded into the forward end region of barrel 56 and which extends downwardly to a mouth 51 located above the thermoplastic sheet 34. The mouth of the nozzle 62 is machined to engage sealingly a gate plate 64 having defined therein an orifice 66 for controlling the time when, the amount of a quantity 68 heated thermoplastic plastic material is selectively deposited on a predetermined location of the sheet 34. The gate plate 64 is mounted for reciprocal movements across the mouth 51 responsive to movements of a rod member 72 which is reciprocally moved by fluid cylinder assembly 70. Nozzle 62 can have any convenient construction.

The placement assembly 52 includes a chase 74 mounted to cylinder rods 76 (not detailed in FIG. 11) associated with fluid cylinder assemblies 78. The chase 74 is provided to establish a selective area portion (here illustratively a circular area) on the thermoplastic sheet 34 on which the quantity 68 of second thermoplastic plastic material is deposited from mouth 51 in a thermoplastic state. The chase 74 is provided internally with a suitable passageway network 80 for the circulation therethrough of a heat transfer fluid to control the temperature of chase 74 to aid in regulating the temperature desired for quantity 68 and sheet 34 in station A prior to indexing the sheet 34 to the next station B.

The support assembly 54 includes a support shoe 82 which has a flat upper face 83 and which is provided internally with a passageway network 84 for the circulation therethrough of a heat transfer fluid to control the temperature of sheet 34 and quantity 68 in station A, any convenient controlled heating means may be employed as those skilled in the art will appreciate. The back or bottom face of the support shoe 82 is mounted to a rod 88 for reciprocal movements towards and away from the back or bottom face of sheet 34. Rod 88, in turn, is associated with fluid cylinder assembly 86.

Referring now to FIG. 12 in conjunction with FIG. 9, station B is seen to be provided with a guiding assembly 90, a shaping assembly 92, and a support assembly 94. The guiding assembly 90 of station B is similar in structure and function to the placement assembly 52 of station A, and includes a chase 96 with a passageway network 98 for circulating therethrough of a heat transfer fluid for temperature control. The chase 96 is reciprocally mounted to fluid cylinder assemblies 100 by respective cylinder rods 102 for movements towards and away from the upper face of sheet 34.

The shaping assembly 92 includes a stamper foot 104 which has a flat lower face 105 and which is provided internally with a passageway network 106 for the circulation therethrough of a heat transfer fluid to control the temperature of quantity 68. Stamper foot 104 is mounted for reciprocal movements towards and away from quantity 68 to a rod 110 which, in turn, joins fluid cylinder assembly 108. The peripheral configuration of the stamper foot 104 conforms closely to the inner configuration of the chase 96 to minimize any seepage of the second thermoplastic material from quantity 68 therebetween. The chase 96, and the foot 104, together with associated components coact to form the quantity 68 into a disc shaped body in the embodiment shown. However, the contacting surface of the stamper foot may be, if desired, specially configured to distribute the second thermoplastic material in a quantity 68 in some selected (or uneven) manner, dependent on the shape or configuration desired in a product article with regard to the eventual distribution of thermoplastic materials therein.

The support assembly 94 includes a support shoe 112 internally provided with a suitable passageway network 114 for the circulation of heat transfer fluid therethrough for temperature control; any suitable controlled heating means may be employed, as those skilled in the art will readily appreciate. The back or bottom face of the support shoe 112 is mounted to a rod 118 for reciprocal movements towards and away from the back or bottom face of sheet 34. Rod 118, in turn, is associated with fluid cylinder assembly 116.

Referring now to FIG. 13 in conjunction with FIG. 9, station C is seen to be provided with an initial molding assembly 128 which includes a forming die assembly 122 and a forming plate assembly 124. The forming die assembly 122 includes a female forming die 126 mounted for reciprocal movements towards and away from the upper surface of the composite of sheet 34 and quantity 68 to the end of a rod 130 which, in turn, connects with a fluid cylinder assembly 120.

The forming plate assembly 124 includes a male forming plate 132 mounted for reciprocal movements to a fluid cylinder assembly 134 by an interconnecting cylinder rod 136. Plate 132 is adapted to be matingly received within die 126 with the composite of sheet 34 and quantity 68 formed therebetween. Each of the forming die 126 and forming plate 132 are provided with a passageway network 138 and 140, respectively, for circulating therethrough a heat transfer fluid for temperature control; any convenient controlled heating means may be employed as those skilled in the art will readily appreciate.

The forming portion 14 of the apparatus 10 (see FIGS. 9 and 10) is comprised of a blowing station 26 (Station D) and the cooling station 28 (Station E) circumferentially equally spaced about and mounted on a rotary table assembly 150, including a rotary table 152.

Referring now to FIG. 14 in conjunction with FIG. 9, the blowing station 126 is seen to include mating blow mold halves 154 mounted for reciprocal horizontal separating and joining movements to a vertically movable platen 156 in a conventional manner known to one skilled in the art. Beneath the mold halves 154, there are disposed thread forming plates 158 mounted to fluid cylinder assemblies 160 by interconnecting cylinder rods 162.

Each operating piston of the rotary table 152 includes a piston 164 disposed within a chamber 166 defined in the rotary table 152. Each piston 164 is positioned therein for vertical movements by a centrally apertured cap plate 168 which is threadably mounted about its periphery to table 152 and through which a central sleeve portion 190 of each piston 164 is slidably extensible and retractable to a limited extent. Conduits 170 and 172 are defined in the rotary table 152 and are each in fluid communication with a different portion of the chamber 166 on either side of the piston 164. The piston 164 is formed with an axially disposed cylindrical passageway 174 defined therein within which an extendible and retractable core pin 176 is positioned for reciprocal movements. The core pin 176 is provided with an axial channel 178 and orifices 180 radially connected therewith to permit the introduction of a fluidic expansion medium into the interior of a preform, as hereinafter more fully described. The end of the core pin 176 is provided with a conically-sided support element 182 which here has a flattened head portion 183.

From the upper surface of the piston 164, there is axially affixed a cylindrical sleeve 190 on which is mounted a top plate 192. Circumferentially about sleeve 190 and in slidable engagement therewith is positioned a plate 194 which has a circumferential cutting edge abutment 195. Between plate 194 and plage 192 an elastomeric body 196 is positioned. Plate 194 is adapted to abut against a shoulder (not detailed) formed on sleeve 190 so that downward movement of plate 194 relative to sleeve 190 is limited thereby. When sleeve 190 is lowered, plate 168 limits travel of plate 194 and body 196 is impressed and radially expanded. Thus, in a non-operative or relaxed mode, the resilient, elastomeric body 196 assumes a substantially cylindrical shape. When body 196 is compressed by the downward movement of plate 196, the body 196 is forced radially outwardly against the thermoplastic materials of preform 210 to cause such thermoplastic materials to be forced radially outwardly against the thread plates 158 thereby to form a threaded neck portion 198 of the formed container 200.

Referring now to FIG. 15 in conjunction with FIG. 9, the cooling station 28 (Station E) is seen to be similar to station 26 described above, except that here the mold components 154 and 158 and their associated components constituting the system for forming a hollow article remain at station 26 (Station D). At each such station 28 (Station E) there is provided a conically sided, flat ended support element 206 which is suspended from an overhead fluid cylinder assembly 208 for reciprocal movements by means of an interconnecting rod 204 to and from the bottom portion of an article 200 being fabricated. As illustrated in FIG. 10, four holding stations 28 are provided on the rotary table assembly 150.

A Station F, generally designated as 209, is provided for the removal of each formed container (or article) 200 onto a conveyor assembly (not shown) for subsequent inspection, filling, packaging, or the like of such formed container 200.

In operation, sheet 34 is unwound from the roll 31 in response to the movement of the chain 44 in accordance with the operational cycle of the apparatus 10 determined, inter alia, by such factors the size and thickness of the article being formed, the types of thermoplastic materials being used, and the like. The sheet 34 is heated to a formable plastic state during passage under the heat source 36. The heated sheet 34 is indexed to Station A whereat the chase 74 is lowered into contact with the sheet 34 by the action of the fluid cylinder assemblies 78. Simultaneously (or before or after, as desired), the support shoe 82 is raised to a contacting position with the underside of sheet 34 by actuation of the fluid cylinder assembly 86. Extrusion of the second thermoplastic material is initiated by moving orifice 66 of the gate 64 into co-axial alignment with the extrusion nozzle 62 with the screw 60 of the extrusion assembly 50 moving plastic forward in a manner known to one skilled in the art. After deposition of a preselected quantity 68 of thermoplastic material, the gate 64 is displaced in response to actuation of the fluid cylinder 70 to arrest the flow of plastic material. The chase 74 and support shoe 82 are returned to their respective initial positions and the sheet 34, carrying quantity 68, is indexed to Station B.

At Station B, referring to FIG. 12, the support shoe 112 is raised in response to the actuation of the fluid cylinder assembly 116 to a point whereat the support shoe 112 is in contact with the underside of the sheet 34. The chase 96 is lowered into a contacting relationship with the sheet 34 in response to the actuation of the fluid cylinder assemblies 100 whereupon the stamper foot 104 is lowered by actuation of the fluid cylinder assembly 108 to a position whereat the foot 104 causes the thermoplastic material 68 to be distributed over the select portion of the sheet 34 within chase 96 thereby to form quantity 68 into a disc shape in the embodiment shown. After a predetermined time period, the stamper foot 104 is raised by fluid cylinder assembly 100, the support shoe 112 is lowered by cylinder assembly 116 and the chase 96 is moved vertically upwardly to respective starting positions by respective actuations of fluid cylinder assemblies 100 after which the sheet 34 carrying quantity 68 is indexed to Station C.

At Station C, referring to FIG. 13, the forming die 126 is moved vertically downwardly in response to fluid cylinder assembly 120 with the forming plate 132 being raised by actuation of fluid cylinder assembly 134 thereby forming the composite sheet 34 and quantity 68 into a preform 210. After a predetermined time interval, the forming die 126 and the forming plate 132 are each returned to their respective starting positions by actuation of fluid cylinders 120 and 134, respectively, and the sheet 34 carrying preform 210 integrally therewith is indexed to Station D.

At Station D, referring to FIG. 14, after such indexing of the preform 210 into position, the die halves 154 and the thread plates 158 are moved into operative association. Pressurized fluid (e.g. air) is introduced into conduit 170, and thus into the portion of the chamber 166 above the piston 164, causing the piston 164 to be moved vertically downwards together with the associated sleeve 190 and the plate 192 resulting in a movement of resilient material 196 outwardly against the preform 210 thereby causing a portion of the preform 210 to be forced radially against the thread dies 158. Thereafter, the blow pin 176 is moved vertically upwardly, such as disclosed in my copending application U.S. Ser. No. 583,427, filed June 3, 1975, now U.S. Pat. No. 4,085,177, assigned to the same assignee as the present invention, together with the introduction of a pressurized fluid through the passageway 178 and orifices 180 formed in the blow pin 176, thereby causing preform 210 to expand into the configuration shown in FIG. 14 identified as container 200. Pressurization is maintained for a predetermined time interval, after which pressurization is reduced to a level to support the blown container 200 against collapsing or further extension after separation and removal of the mold halves 154 and thread plates 158. After blowing, a compressed fluid is introduced into conduit 172 with conduit 170 being vented to the atmosphere to cause the piston 164 to return to an initial position whereby the resilient material 196 is returned to an uncompressed state and thereby assumes a substantially cylindrical configuration. The thread plates 158 are thereafter retracted by actuation of cylinders 160, and the mold halves 132 are separated and returned to an initial position whereupon the rotary table 152 is indexed sixty degrees. It is to be noted that sheet 34 is cut at an angle represented by line 218 in FIG. 2 by an assembly (not shown) during the processing functions of Station D to permit portions of the sheet 34 to revolve on the table 152 until final trimming and removal of the container 200 whereupon the residual material is removed and passed to subsequent processing operations (not shown) for reclamation of such residual thermoplastic materials.

At Station E, referring to FIG. 15 the end support element 206 is lowered into contacting relationship with the bottom of the container 200 by actuation of the fluid cylinder assembly 208 with such contacting relationship being maintained through three subsequent indexes of apparatus 10 operation. At the last Station F, the hollow article 200 may be alternately trimmed from the residual material by increasing the pressure in conduit 172 to cause the piston 164 to be raised to an extent that the upper portion thereof is above the level of the rotary table 152 at which point trim dies 212, referring to FIG. 15, are caused to be moved against each other by fluid cylinder assemblies 214 operatively associated with cylinder rods 216.

It will be understood by those skilled in the art that other methods and apparatus may be used to trim the product article either as part of the hereinabove described apparatus or downstream of product removal station 209.

It will be understood by those skilled in the art that a plurality of Stations A and B may be successively provided to form a complete laminate structure (not shown) of more than two thermoplastic materials prior to formation therefrom of a preform at Station C.

The rotatable forming assembly 150, it is contemplated, may be used to form single layered hollow articles from a single heated sheet of thermoplastic materials.

As hereinabove mentioned, the latent heat of the molten thermoplastic material quantity 68 is preferably generally sufficient to heat the underlying sheet 34 to a temperature for thermoforming (i.e., by the time such area reaches the molding station), thereby optionally eliminating any requirement for heating such underlying sheet prior to selective deposition.

Figure 16:
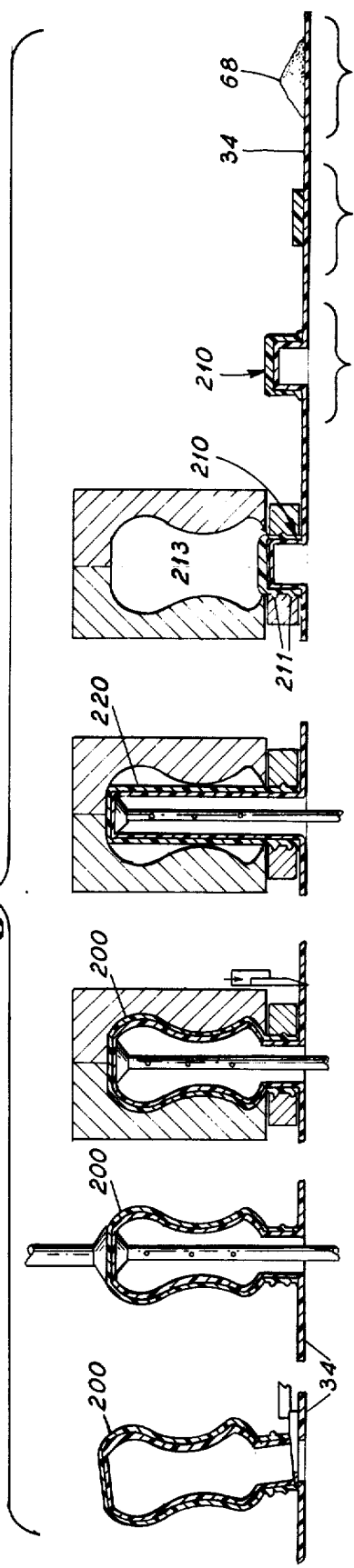
FIG. 16 is a diagrammatic vertical sectional view of successive stages in container formation as accomplished in the apparatus of FIGS. 9 and 10 but with apparatus elements removed for greater clarity.
Figure 17:
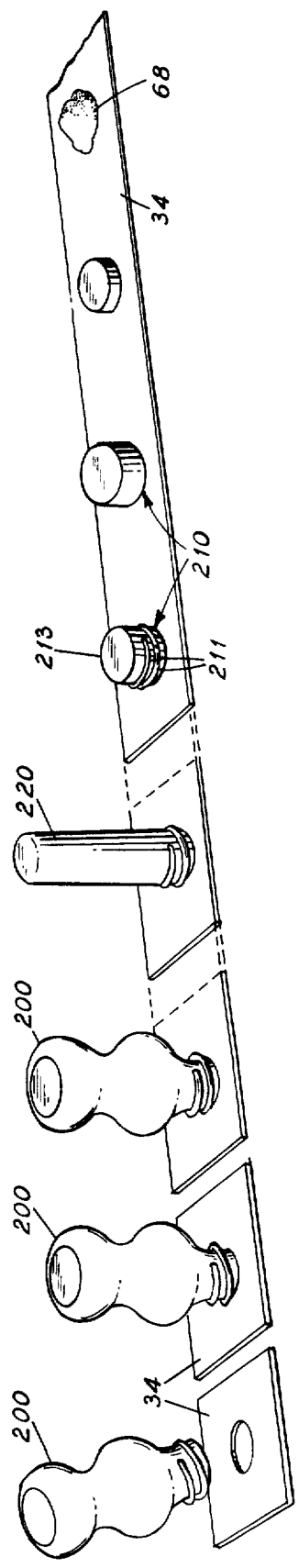
FIG. 17 is a diagrammatic perspective view of the same successive stages as shown in FIG. 16, and, likewise, with apparatus elements similarly removed.

FIGS. 16 and 17 illustrate the appearance of a container at various successive stages in its production by the practice of the process of this invention. The appearance at the end of each of stations A, B and C, respectively, is labeled; a single forming operation is achieved in each such station, as shown. In station D, however, three separate stages of forming may be discerned. Thus, here in an initial forming stage D1, the preform 210 is positioned between the thread forming plates 158 and the body 196. After radial expansion of body 196, threads 211 are formed as is a dome 213 in preform 210. Then, core pin 176 moves upwardly thereby advancing support element 182 to produce an axially elongated parison-like body 220 in an intermediate forming state D2. Next, as the core pin 176 nears the end of its upward thrust of movement, the axial channel 178 is pressurized with a compressed fluid, such as air or the like, which expands and stretches the parison-like body 220 outwardly into engagement with the blow mold halves 154. When support element 182 reaches the top of its travel path in spaced relationship to the adjacent here overlying blow mold halves 154, the space therebetween is filled by the thickness of the bottom portion of the container 200 being formed, and the container 200 side walls are engaged with and formed by blow mold halves, thus completing a final forming stage D3.

At this point in production, the mold halves 154 are removed and the container 200 with residual thermoplastic material still attached thereto at the neck region thereof is indexed to station E where the end support element 206 is brought into supporting spaced adjacent relationship with support element 182, as explained above, with the bottom portion of container 200 therebetween. This relationship is maintained during the next three indexing locations about rotary table 152, thus, station E can be considered to comprise a total of four indexed locations circumferentially spaced about table 152. The appearance of container 200 in this formation stage is shown in FIGS. 16 and 17.

Finally, the container 200 enters station F where container is cut from scrap portions of sheet 34 and quantity 68 (here not detailed), thereby completing a forming operation.

From the preceding description, it is appreciated that the process of the present invention involves the thermoforming of a hollow article from a substrate sheet of thermoplastic material. A moldable quantity of a thermoplastic material is deposited in a heated thermoplastic state on an area of a substrate sheet. Such quantity is shaped on the substrate sheet to form a composite region of predetermined perimeter dimensions and thickness dimensions on such substrate sheet. Typically, the starting substrate sheet has opposed, spaced, parallel faces, and the region of the shaped, deposited thermoplastic material likewise has typically opposed, spaced, parallel faces, but variations in such thickness characteristics are possible, and the actual average respective thicknesses of starting substrate sheet and shaped layer of deposited thermoplastic material can vary over very large ranges. Present preferences involve the use of starting substrate sheet members having thicknesses ranging from about 0.020 to 0.080 inches and the use of starting shaped layers of thermoplastic material on such a starting substrate sheet member ranging from about 0.100 to 0.500 inches, but it will be understood that such ranges are for illustration purposes only, that thicker and thinner valves can be employed if desired, and that no limitations on the teachings herein are to be implied or inferred therefrom. Processing temperatures and pressures vary greatly, depending upon many significant variables, such as the particular thermoplastics employed, their thicknesses, container thicknesses desired and the like, so that it does not appear possible to provide exact statements of temperatures and pressures for the practice of the present invention.

After a composite of starting sheet substrate and shaped layer thereon has been prepared, such is introduced into a thermoforming operation resulting in a multilayed hollow article from such composite. Preferably, such article has an inner layer of one thermoplastic material and an outer layer of another thermoplastic material.

More specifically, after the initial depositing and shaping, a composite section comprised of preformed sheet and shaped, deposited layer is first compression molded between mating female and male mold means to form a cavity therein whose exterior surface portions are continuously comprised of first thermoplastic material and whose interior surface portions are continuously comprised of said second thermoplastic material. Also, the cavity is characterized further by having continuously adjacent the perimeter of its mouth wall portions which extend perpendicularly relative to the cross-sectional area defined by said mouth. Compression molding is accomplished with the composite section being maintained in a moldable plastic state. A cavity or cavities so produced may be used as such, if desired, as a container or containers (as the case may be). Alternatively, further processing may be, and preferably is, undertaken.

Thus, such perpendicularly extending wall portions of such a compression molded composite section are continuously circumferentially clamped between radially opposed respective interior and exterior clamping means located adjacent the perimeter of said mouth. A mandrel means is then advanced into said mouth through said interior clamping means and into engagement with said interior surface portions to stretch and to form said so compression molded composite section into a continuously multi-walled cross-sectionally generally uniformly shaped close-ended elongated body. The said first and said second thermoplastic materials are maintained in respective moldable plastic states. Such a body or bodies can be used as such, if desired, as a container or containers (as the case may be). Alternatively, further processing may be, and preferably is undertaken.

Thus, into the interior of such an elongated body, with said perpendicularly extending wall portions remaining so clamped, a pressurized fluid is charged whose pressure is sufficient to expand the walls of such elongated body outwardly into continuous engagement with such exterior surface portions thereof with a concurrently circumscribing mold means having a predetermined molding surface defined therein. The first and the second thermoplastic materials are maintained in respective moldable plastic states. A multi-walled plastic container is thus made which thereafter is cooled and preferably trimmed.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto-appended claims.

I claim as my invention:

1. In a process for thermoforming a hollow article from a substrate of thermoplastic material, the improvement comprising:
   (a) depositing a moldable thermoplastic material in a plastic state on said substrate of thermoplastic material in a limited area to be formed into said article;
   (b) thereafter shaping said moldable thermoplastic material on said substrate of thermoplastic material in said limited area to be formed to form a shaped composite section of thermoplastic material;
   (c) introducing said shaped composite section into a thermoforming station; and
   (d) thermoforming a multilayered hollow article from said shaped composite section of thermoplastic material, said multilayered hollow article having an inner layer of one thermoplastic material and an outer layer of another thermoplastic material.

2. The process of claim 1 wherein said composite is preformed prior to said thermoforming.

3. The process of claim 1 wherein a second moldable material is deposited on said composite section prior to said thermoforming.

4. The process of claim 1 wherein said substrate is heated prior to said depositing.

5. In a process for making a multiwalled plastic container by introducing a composite section of thermoplastic materials in a moldable, plastic state into a thermoforming station and thermoforming said multiwalled plastic container from said composite section, the improvement comprising preparing said composite section by the steps of
   (a) depositing a predetermined quantity of a moldable first thermoplastic material in a plastic state in a predetermined area on one surface of a preformed formable sheet of second thermoplastic material;
   (b) thereafter shaping said quantity in said area on said surface to form said quantity into a layer distributed over said area on said surface and produce a composite section comprised of said sheet and said layer; and
   (c) compression molding said composite section between mating female and male mold means to form a cavity therein whose exterior surface portions are continuously comprised of said first thermoplastic material and whose interior surface portions are continuously comprised of said second thermoplastic material, said cavity further having continuously adjacent the perimeter of the mouth thereof wall portions which extend perpendicularly relative to the cross-sectional area defined by said mouth, said composite section being maintained in a moldable, plastic state.

6. The process of claim 5 wherein said perpendicularly extending wall portions of said compression molded composite section are continuously circumferentially clamped between radially opposed respective interior and exterior clamping means located adjacent the perimeter of said mouth, and a mandrel means is advanced into said mouth through said interior clamping means and into engagement with said interior surface portions to stretch and form said so compression molded composite section into a continuously multi-walled cross-sectionally generally uniformly shaped close-ended elongated body, said first and said second thermoplastic materials being maintained in respective moldable plastic states.

7. The process of claim 6 wherein, into the interior of said elongated body, with said perpendicularly extending wall portions remaining so clamped, a pressurized fluid is charged sufficient to expand the walls of said elongated body outwardly into continuous engagement of said exterior surface portions thereof with a concurrently circumscribing mold means having a predetermined molding surface defined therein, said first and second thermoplastic materials being maintained in respective moldable plastic states thereby to make a multiwalled plastic container.

8. A process for making a multiwalled plastic container comprising the steps of
   (a) depositing a predetermined quantity of a moldable first thermoplastic material in a plastic state in a predetermined area on one surface of a preformed formable sheet of second thermoplastic material;
   (b) thereafter shaping said quantity in said area on said surface to form said quantity into a layer distributed over said area on said surface and produce a composite section comprised of said sheet and said layer; and
   (c) compression molding said composite section between mating female and male mold means to form a cavity therein whose exterior surface portions are continuously comprised of said first thermoplastic material and whose interior surface portions are continuously comprised of said second thermoplastic material said cavity further having continuously adjacent the perimeter of the mouth thereof wall portions which extend perpendicularly relative to the cross-sectional area defined by said mouth, said composite section being maintained in a moldable plastic state;
   (d) continuously circumferentially clamping said perpendicularly extending wall portions between radially opposed respective interior and exterior clamping means located adjacent the perimeter of said mouth;

(e) with said perpendicularly extending wall portions so clamped, advancing a mandrel means into said mouth through said interior clamping means and into engagement with said interior surface portions to stretch and form said so compression molded composite section into a continuously multi-walled cross-sectionally generally uniformly shaped, close-ended elongated body, said first and said second thermoplastic materials being maintained in respective moldable plastic states;

(f) with said perpendicularly extending wall portions remaining so clamped, charging a pressurized fluid into the interior of said elongated body sufficient to expand the wall of said elongated body outwardly into continuous engagement of said exterior surface portions thereof with the molding surface of a concurrently circumscribing mold means having such molding surface defined therein, said first and second thermoplastic materials being maintained in respective moldable plastic states thereby to make a desired multiwalled plastic container; and (g) cooling said so produced container while maintaining the desired shape thereof until said container becomes self-supporting.

9. The process of claim 8 wherein, after said cooling, any undesired remaining portions of said first and said second thermoplastic materials are trimmed away.

10. The process of claim 8 wherein steps (a) and (b) are sequentially repeated at least once with the repeat involving such a depositing upon the surface of the layer or layers shaped in step (b) of a predetermined quantity of a moldable thermoplastic material in a plastic state in the area of said layer or layers on said area.

* * * * *